(12) United States Patent
Shinohara et al.

(10) Patent No.: US 7,106,771 B2
(45) Date of Patent: Sep. 12, 2006

(54) SEMICONDUCTOR LASER DEVICE AND OPTICAL PICKUP DEVICE

(75) Inventors: Hisayuki Shinohara, Nara-ken (JP); Akira Ariyoshi, Nara (JP); Osamu Hamaoka, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 310 days.

(21) Appl. No.: 10/650,081

(22) Filed: Aug. 28, 2003

(65) Prior Publication Data

US 2004/0109484 A1 Jun. 10, 2004

(30) Foreign Application Priority Data

| Aug. 28, 2002 | (JP) | ............... P2002-248827 |
| Jul. 2, 2003 | (JP) | ............... P2003-190450 |

(51) Int. Cl.
*H01S 5/00* (2006.01)

(52) U.S. Cl. ............... 372/43.01; 372/106; 372/102; 372/101; 369/103; 369/110.01

(58) Field of Classification Search ......... 372/43.01, 372/106, 102, 101, 36; 369/103, 110, 112.03, 369/112.15; 250/201.5; 359/495
See application file for complete search history.

(56) References Cited

U.S. PATENT DOCUMENTS

| 5,535,055 | A * | 7/1996 | Ono et al. ............... 359/495 |
| 5,608,695 | A * | 3/1997 | Yamazaki ............... 369/44.12 |
| 5,727,009 | A * | 3/1998 | Tajiri et al. ............... 372/50.11 |
| 6,192,020 | B1* | 2/2001 | Takasuka et al. ............... 369/103 |
| 6,195,315 | B1* | 2/2001 | Takahashi et al. ............... 369/44.23 |
| 6,594,206 | B1* | 7/2003 | Katayama ............... 369/44.32 |
| 6,643,245 | B1* | 11/2003 | Yamamoto et al. ............... 369/112.01 |
| 6,785,203 | B1* | 8/2004 | Maruyama et al. ............... 369/44.23 |
| 6,925,039 | B1* | 8/2005 | Yanagawa et al. ............... 369/44.32 |
| 2003/0053393 | A1* | 3/2003 | Shimano et al. ............... 369/112.02 |
| 2003/0174631 | A1* | 9/2003 | Nishiyama et al. ............... 369/112.06 |
| 2004/0125454 | A1* | 7/2004 | Kawasaki et al. ............... 359/569 |
| 2004/0202224 | A1* | 10/2004 | Ikehara et al. ............... 372/102 |
| 2004/0233533 | A1* | 11/2004 | Tanaka et al. ............... 359/566 |
| 2004/0246874 | A1* | 12/2004 | Takagi et al. ............... 369/112.15 |

FOREIGN PATENT DOCUMENTS

| CN | 1218255 | 6/1999 |
| JP | 61-250844 | 11/1986 |
| JP | 62-298195 A | 12/1987 |
| JP | 6162547 | 6/1994 |
| JP | 2565185 | 3/1996 |
| JP | 11-213424 | 8/1999 |
| JP | 2000-260053 | 9/2000 |
| JP | 2002-148436 | 5/2002 |
| KR | 1994-1817 U | 1/1994 |

OTHER PUBLICATIONS

Korean Office Action issued Jul. 29, 2005, directed to corresponding Korean application.

* cited by examiner

*Primary Examiner*—Minsun Oh Harvey
*Assistant Examiner*—Delma R. Flores-Ruiz
(74) *Attorney, Agent, or Firm*—Morrison & Foerster LLP

(57) ABSTRACT

A semiconductor laser device has a semiconductor laser and a polarizing diffraction grating that is arranged ahead of the semiconductor laser. A reflected light from an optical recording medium is diffracted by the polarizing diffraction grating according to the polarization direction of the reflected light. The reflected light is thereby deviated from the direction toward the semiconductor laser to prevent the reflected light from returning to the semiconductor laser.

16 Claims, 12 Drawing Sheets

SEMICONDUCTOR LASER DEVICE AND OPTICAL PICKUP DEVICE

BACKGROUND OF THE INVENTION

This invention relates to a semiconductor laser device and an optical pickup device, and in particular to an optical pickup device for use in an apparatus for optically recording or reproducing information on an information recording medium. This invention also relates to a semiconductor laser device and an optical pickup device that have a hologram device, and in particular to a semiconductor laser device and an optical pickup device for use in reading and writing a signal on an optical recording medium.

Conventionally there has been an optical pickup device as shown in FIG. 5. A laser chip 108 in a semiconductor laser device 101 of the optical pickup device emits a laser beam L which is incident on a diffraction grating 102. The laser beam L is split into a main beam L0 and two side beams L+1 and L−1 by the diffraction grating 102. The three beams (main beam L0 and side beams L+1 and L−1) are transmitted through a beam splitter 103 and transmitted through a collimator lens 104. The three beams are transformed into parallel beams by the collimator lens 104, and thereafter incident on an object lens 105. The object lens 105 focuses the beams on a surface of an optical disk 106 into a spot. Then, the three beams are reflected on the surface of the optical disk 106. The beams are transmitted successively through the object lens 105 and the collimator lens 104. The beam splitter 103 reflects the beams so that the beams are made incident on a photodetector 107. Consequently, the three beams are detected as information by the photodetector 107.

For another example, FIG. 11 shows a hologram-integrated type semiconductor laser device 180 of one red beam system. FIG. 12 shows an optical pickup device provided with the semiconductor laser device 180.

In this optical pickup device, light emitted from a semiconductor laser 157 is transmitted through a signal hologram 155. The light is diffracted into zero-order diffracted light, positive first-order diffracted light and negative first-order diffracted light by the signal hologram 155. Among these diffracted light rays, only the zero-order diffracted light is transmitted through the collimator lens 181 shown in FIG. 12 and transformed into parallel light by the collimator lens 181. The parallel light is transmitted through a quarter-wavelength plate 182. At this time, quarter-wavelength plate 182 generates phase difference of 45° between the light rays whose polarization directions are perpendicular to each other. Thereby, linearly polarized light is consequently transformed into circularly polarized light. Then the light is made incident on a raising mirror 183. The raising mirror 183 allows the light to be bent by an angle of 90 degrees and guided toward an optical disk 185. The light is concentrated on the optical disk 185 by an object lens 184.

Then, the light is reflected by the optical disk 185 to return the above-stated light path. That is, the light is transmitted through the object lens 184, bent by an angle of 90 degrees by the raising mirror 183 and made incident on the quarter-wavelength plate 182. The quarter-wavelength plate 182 further rotates the polarization direction of the light by an angle of 45 degrees, so that red light 186 generates whose polarization direction is rotated by an angle of 90 degrees in total through the forward path and the return path of the light. This return light 186 is transmitted through the collimator lens 181, and diffracted by the signal hologram 155 of a hologram device 154. The signal hologram 155 allows the positive first-order diffracted light 159 to be concentrated on the light-receiving device 158.

Other related arts of the present invention are disclosed in Japanese Patent Laid-Open Publication Nos. SHO 61-250844 and 2002-148436.

The optical pickup devices as shown in FIGS. 5 and 12 have such drawbacks as to degrade the signal detection characteristic and the servo characteristic of the optical pickup device because the beams reflected on the surface of the optical disk partially return to the semiconductor laser or its surroundings as optical noises. Also, these optical pickup devices has a drawback that the return light to the semiconductor laser generates the SCOOP (Self Couple Optical Pickup) phenomena exerting a harmful influence on the oscillation state of the original laser beam.

Specifically, in the optical pickup device shown in FIG. 5, parts Lm, Ls1, Ls2 of three beams reflected on the surface of the optical disk 106 return to the semiconductor laser device 101, as shown in FIG. 6. Consequently, the return beams Lm, Ls1 and Ls2 are reflected by the laser chip 108 and its surrounding part 111 in the semiconductor laser device 101, to goes back again the optical system located between the semiconductor laser device 101 and the optical disk 106. This causes the reflected return beams to be disadvantageously interfered with the original beam L as optical noises, which leads to significant deterioration of signal detection characteristic and the servo characteristic of the optical pickup device.

In the case of the SCOOP phenomenon, the gain of the laser beam L is increased by the reflected main beam Lm made incident on the light-emitting end surface 108a of the laser chip 108, so that the power of the laser beam L emitted from the laser chip 108 is undesirably increased. In addition, since the reflected main beam Lm fluctuates according to the surface state of the optical disk 6, the power of the laser beam L also disadvantageously fluctuates in accordance with the above-mentioned fluctuation.

As a method for eliminating the optical noises, the Japanese Patent No. 2565185 discloses that a slant surface is provided on a beam incident part of a header of the semiconductor laser device, or that a reflectionless coating is provided on the beam-emitting end surface.

Also, as shown in FIG. 7, a slant surface 212 is provided on an end surface 211a to reflect a side beam Ls2 in the direction of arrow R, so that the reflected side beam Ls2 is restrained from returning again to the optical system located between the semiconductor laser device 101 and the optical disk 106.

Further, as shown in FIG. 8, a reflector 113 is attached to the end surface 111a of a header section 111 of a stem 110 so as to reflect a beam Ls2 in the direction of arrow R by the reflector 113.

However, all of the above-stated methods have difficulties in formation of the reflectors and so on, which causes low productivity of the semiconductor laser devices.

Specifically, the header section 111 is formed integrally with the stem 110 by press molding in general. That is, the header section 111 is formed by pressing a hoop-shaped (elongated thin plate-shaped) iron material 100 shown in FIG. 9A with a metal mold 701. Since a protruding portion, which becomes the header section 111, is formed on the originally flat plate iron material 100, it is required to apply a very strong pressure to the metal mold 701. Particularly, in order to flatten the end surface 111a of the header section 111 as shown in FIG. 9B, the greatest force is to be applied to a portion 702 opposed to the end surface 111a in the metal mold 701. In this case, to form the slant surface 212 (see FIG. 7) on the end surface 111a of the header section 111, it is also required to provide the metal mold 701 with a slant surface forming portion constituted of a projection or a recess corresponding to the configuration of the slant surface 212. However, the slant surface forming portion, which is provided at the portion 702 to which the maximum pressure is applied as described above, is disadvantageously easily collapsed by pressure. Therefore, in the case where the slant surface 212 is provided on the portion 111a, extremely poor productivity results. Then, this sometimes leads to the destruction of the metal mold 701 itself in the worst case. Accordingly, there is a problem that it is realistically impossible to carry out mass production of the stem 210 that has the header section 211 on which the aforementioned slant surface 212 is directly formed.

Moreover, the method for attaching the reflector 113 to the end surface 111a of the header section 111 has the following problem.

The reflector 113 is required to be extremely accurately attached to the end surface 111a of the header section 111. Depending on the design of the optical system of the optical pickup device, it can also be considered that the reflected side beam Ls2 is incident on the neighborhood of the boundary between the laser chip 108 and the header section 111. Taking the incidence of the reflected side beam Ls2 into consideration, the end surface 111a in the neighborhood of the boundary is required to be covered with the reflector 113. However, it is extremely difficult to attach the reflector 113 so as not to bring the reflector 113 in contact with the laser chip 108. Moreover, when the reflector 113 protrudes from the end of the header section 111, the laser beam L of the laser chip 108 is partially blocked off by the reflector 113 as shown in FIG. 10, and this leads to a problem that the light emission characteristic of the laser chip 108 is degraded. That is, by attaching the reflector 113 to the end surface 111a, a far-field pattern (in the portion of the dotted line D1), which should be essentially present, disadvantageously disappears.

On the other hand, as a counter-measure against the above-stated SCOOP phenomena, there is a method for increasing reflectance of the light-emitting end surface 108a of the laser chip 108 so as to reduce the quantity of return of the reflected main beam Lm to the inside of the laser chip 108. However, the increase in the reflectance of the light-emitting end surface 108a disadvantageously leads to reduction of a differential efficiency ηd of the laser beam L of the laser chip 108, which reduction is unsuitable for increase of output power or reduction of current in the laser chip 108.

Moreover, in the semiconductor laser device and the optical pickup device shown in FIGS. 11 and 12, the signal hologram 155 generates the zero-order diffracted light and the negative first-order diffracted light together with the positive first-order diffracted light 159. The zero-order diffracted light is incident on the light-emitting point of the semiconductor laser 157 as a return optical noise. Then, the zero-order diffracted light exerts such a harmful influence on the semiconductor laser 157 as to provide the laser beam with unstable oscillation.

Also, the negative first-order diffracted light passed through the signal hologram 155 is reflected by a top surface of a stem 152 and inner surfaces of a cap 153, which light may be made incident as unnecessary stray light rays on the light-receiving device 158, consequently causing an increase in signal offset and degrading the signal processing capability of the optical pickup device.

SUMMARY OF THE INVENTION

An object of this invention is to provide a semiconductor laser device and an optical pickup device capable of reducing the return light to the semiconductor laser device at low cost.

In order to achieve the aforementioned object, the present invention provides a semiconductor laser device comprising:
a semiconductor laser for emitting laser light toward an object to be irradiated;
a diffracting section for diffracting the laser light reflected on the object according to a polarization direction of the reflected laser light to deviate the reflected laser light from a direction toward the semiconductor laser.

In this invention, the diffracting section diffracts the reflected light according to the polarization direction of the incident reflected light to deviate the reflected light from the direction toward the semiconductor laser, so that the reflected light does not return to the semiconductor laser. Therefore, according to this invention, the return light to the semiconductor laser can be reduced.

In one embodiment of the present invention, the semiconductor laser device further comprises:
a hologram device having a signal hologram; and
a light-receiving device, wherein
the laser light emitted from the semiconductor laser is applied to the object to be irradiated by way of the signal hologram,
the laser light reflected on the object is diffracted by the hologram device, and
the diffracted laser light is received by the light-receiving device.

In this embodiment, the diffracting section is a polarizing diffraction grating that has a varied diffraction efficiency depending on the polarization direction of the incident light as one example and deviates the reflected light from the direction toward the semiconductor laser by rotating the reflected light. That is, the polarizing diffraction grating can reduce noise attributed to the return light by restraining the incidence on the approximate light-emitting point of the semiconductor laser with the diffraction efficiency with respect to the zero-order diffracted light set to approximately zero percent. It is to be noted that the zero-order diffracted light is light transmitted as it is without being diffracted.

In one embodiment of the present invention,
the diffracting section is comprised of a polarizing diffraction grating,
the polarizing diffraction grating is constructed so that a diffraction efficiency of the diffracted light rays other than zero-order diffracted light is approximately zero percent with respect to light that has a first polarization direction, and that a diffraction efficiency of the diffracted light of the zero-order diffracted light is approximately zero percent with respect to light that has a second polarization direction perpendicular to the first polarization direction.

According to this embodiment, the light in the first polarization direction is transmitted without being diffracted by the polarizing diffraction grating, while the light in the second polarization direction is diffracted so that the zero-order diffracted light is not generated. Therefore, by making the polarization direction of the light emitted from the semiconductor laser toward the object to be irradiated serve as the first polarization direction, the laser light can be guided from the semiconductor laser to the object to be irradiated without reducing the quantity of light due to the existence of the polarizing diffraction grating. Moreover, by setting the polarization direction of the light, which is emitted from the semiconductor laser, reflected on the object to be irradiated and made incident on the polarizing diffraction grating as the second polarization direction, the zero-order diffracted light, which may be incident on the semiconductor laser, is not generated in the polarizing diffraction grating, and the noise attributed to the return light can be restrained. It should be noted that the diffraction efficiency is defined as a ratio of strength of diffracted light to strength of incident light.

In one embodiment of the present invention, the semiconductor laser device further comprises:
a quarter-wavelength plate, wherein
the diffracting section and the quarter-wavelength plate are arranged in order toward the semiconductor laser.

In this one embodiment, the diffracting section is the polarizing diffraction grating as one example and transmits the first polarized light in the first polarization direction emitted from the semiconductor laser without diffracting the first polarized light. This laser light transmitted without being diffracted is made to pass through the quarter-wavelength plate, be reflected on the object to be irradiated, pass again through the quarter-wavelength plate and return to the polarizing diffraction grating in the form of a second polarized light in the second polarization direction perpendicular to the first polarization direction. The reflected light (return light), which has become this second polarized light, is diffracted by the polarizing diffraction grating and does not return to the semiconductor laser.

Therefore, the laser output fluctuation (SCOOP phenomenon) attributed to the incidence of the return light from the object to be irradiated on the front end surface of the semiconductor laser can be prevented. Moreover, this can be achieved without increasing the reflectance of the front end surface of the semiconductor laser dissimilarly to the conventional case, and therefore, the differential efficiency of the laser light emitted from the semiconductor laser is not reduced.

Moreover, this embodiment is able to restrain the return light from interfering with the laser light in the forward path, which is not the return light. Therefore, the optical noise that the signal detection characteristic and the servo characteristic are significantly degraded due to the return light in constructing the optical pickup device can be solved. Moreover, this can be achieved without causing a reduction in mass productivity due to the processing of the slant surface, which may cause the destruction of the metal mold, on the base on which the semiconductor laser is mounted, dissimilarly to the conventional case, nor causing a degradation in the light emission characteristic of the semiconductor laser due to the mounting of the reflector on the base.

In one embodiment of the present invention, the semiconductor laser device further comprises:
a base on which the semiconductor laser is mounted; and
a cap having a window through which the laser beam passes and attached to the base, wherein
the diffracting section is comprised of a polarizing diffraction grating and
the polarizing diffraction grating is attached to the window.

In this embodiment, the laser light emitted from the front end surface of the semiconductor laser passes through the window of the cap attached to the base so as to cover the semiconductor laser. In this embodiment, the polarizing diffraction grating is attached to the window of the cap, and therefore, the polarizing diffraction grating can be handled as an object integrated with the semiconductor laser, the base and the cap. Therefore, the parts count can be reduced and the workability of the assembling work can be improved, allowing the manufacturing cost to be reduced.

In one embodiment of the present invention, the semiconductor laser device further comprises a quarter-wavelength plate attached to the window so as to be superposed on the polarizing diffraction grating.

In this embodiment, the quarter-wavelength plate can be handled as an object integrated with the semiconductor laser, the base and the cap in addition to the polarizing diffraction grating. Therefore, the parts count can be reduced and the workability of the assembling work can be improved, allowing the manufacturing cost to be reduced.

In one embodiment of the present invention, the diffracting section is comprised of a polarizing diffraction grating, and the signal hologram and the polarizing diffraction grating are arranged on an optical axis of an optical path of the reflected laser light toward a light-emitting point of the semiconductor laser.

In this embodiment, the reflected light, which is emitted from the semiconductor laser of the light source and reflected on the object to be irradiated (optical recording medium etc.), is diffracted so as not to cause zero-order diffracted light by the polarizing diffraction grating before returning to the point that approximately coincides with the light-emitting point of the semiconductor laser. Therefore, the zero-order diffracted light, which may be incident on the semiconductor laser, is not generated in the polarizing diffraction grating, and the return optical noise can be restrained.

In one embodiment of the present invention, the diffracting section is comprised of a polarizing diffraction grating formed by a linear grating with a roughly equal pitch.

In this embodiment, the reflected light, which is emitted from the semiconductor laser and reflected on the object to be irradiated (optical recording medium etc.), is diffracted by the polarizing diffraction grating, and the diffracted positive first-order diffracted light and the negative first-order diffracted light can be concentrated equidistantly and stably. Therefore, the stray light attributed to the return light can easily be canceled by providing a reflectionless coating on the light concentration position or positioning the light concentration position in a place where stray light is not generated.

In one embodiment of the present invention, the diffracting section is comprised of a polarizing diffraction grating, and the diffracted light diffracted by the signal hologram does not pass through the polarizing diffraction grating.

In this embodiment, the polarizing diffraction grating is provided in the place through which the positive first-order diffracted light and the negative first-order diffracted light diffracted by the signal hologram do not pass. Therefore, the phenomenon that the polarizing diffraction grating diffracts the diffracted light directed from the signal hologram toward the light-receiving device can be avoided. Therefore, the diffracted light, which becomes the signal light, can be prevented from suffering an adverse influence such that the path thereof is changed by the polarizing diffraction grating. Moreover, the positive first-order diffracted light and the negative first-order diffracted light as a result of diffracting the reflected light by the polarizing diffraction grating can be stably concentrated on the desired places.

In one embodiment of the present invention, the diffracting section is comprised of a polarizing diffraction grating, and a quarter-wavelength plate is provided in the hologram device.

In this embodiment, by virtue of the provision of the quarter-wavelength plate that has the function to change the polarization direction inside the hologram device, the effect of the polarizing diffraction grating such that the diffraction efficiency differs according to the polarization direction of the incident light can be obtained with a compact construction, and the optical pickup device can be reduced in size.

In one embodiment of the present invention, the diffracting section is comprised of a polarizing diffraction grating, and the hologram device is an optical member that integrally has the signal hologram and the polarizing diffraction grating.

In this embodiment, the signal hologram and the polarizing diffraction grating are integrally provided on, for example, the front and rear surfaces of the hologram device, and compactification can be achieved. Therefore, the optical pickup device can be totally reduced in size.

In one embodiment of the present invention, the diffracting section is comprised of a polarizing diffraction grating, and the signal hologram and the polarizing diffraction grating are provided as separate optical members.

In this embodiment, the signal hologram and the polarizing diffraction grating are provided by separate optical members. Therefore, it is possible to attach, for example, the signal hologram to the hologram device and provide the polarizing diffraction grating in the cap window portion located on the package side where the semiconductor laser is accommodated or in a similar portion. This therefore facilitates the adjustment of the relative positions of the signal hologram and the polarizing diffraction grating.

In one embodiment of the present invention, the diffracting section is comprised of a polarizing diffraction grating, and the semiconductor laser, the signal hologram, the polarizing diffraction grating and the light-receiving device are integrated in one package.

In this embodiment, the semiconductor laser, the signal hologram, the polarizing diffraction grating and the light-receiving device are integrated into one package, and this therefore enables the reduction in the parts count and the reduction in the size of the semiconductor laser device. If the cross-sectional shape of the package in the plane perpendicular to the optical axis of the semiconductor laser has an elliptic shape, then a reduction in thickness in the direction perpendicular to the optical axis can be achieved in comparison with the case where a package whose cross-sectional shape is circular is adopted, and the optical pickup device can be reduced in thickness.

In one embodiment of the present invention, the diffracting section is comprised of a polarizing diffraction grating, and the polarizing diffraction grating has a lens characteristic such that the reflected laser light forms an image on a surface different from a light-emitting end surface of the semiconductor laser and a extended surface of the light-emitting end surface in a direction along which the reflected light travels or a lens characteristic such that the reflected laser light is formed into parallel light.

In this embodiment, the polarizing diffraction grating has a lens characteristic such that the reflected light forms an image on the surface different from the light-emitting end surface of the semiconductor laser and the surface of the extension of this light-emitting end surface in the direction in which the reflected light travels or the reflected light is formed into parallel light. Therefore, the reflected light is prevented from returning to the light-emitting end surface of the semiconductor laser, and the generation of SCOOP noise can be avoided.

In one embodiment of the present invention, an optical pickup device comprises:
the above-stated semiconductor laser device wherein the diffracting section is comprised of a polarizing diffraction grating,
an optical system guiding the laser light emitted from the semiconductor laser to an optical recording medium that serves as the object to be irradiated and guiding the light reflected from the optical recording medium to the polarizing diffraction grating, wherein
the optical system has a phase difference plate for changing a state of polarization of the light emitted from the semiconductor laser from linearly polarized light into circularly polarized light or from circularly polarized light into linearly polarized light.

In this embodiment, the light emitted from the semiconductor laser has its polarization direction changed by the phase difference plate owned by the optical system through the forward path to the optical recording medium and the return path from the optical recording medium and then guided to the polarizing diffraction grating. As a result, this polarizing diffraction grating diffracts the reflected light from the optical recording medium so as to deviate the light from the direction toward the semiconductor laser. This enables the provision of a highly reliable optical pickup device in which the return optical noise is suppressed by restraining the unnecessary light attributed to the reflected light from becoming stray light and from being made incident on the semiconductor laser as the light source.

In one embodiment of the present invention, an optical pickup device comprises the above-stated semiconductor laser device, and a photodetector for detecting the laser light reflected from the object to be irradiated.

According to this embodiment, there can be provided an optical pickup device that can achieve the reduction of the return light to the semiconductor laser at low cost.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Semiconductor laser devices of the present invention and optical pickup devices provided with the same will be described in detail below based on embodiments thereof with reference to the drawings.

First Embodiment

Figure 1:
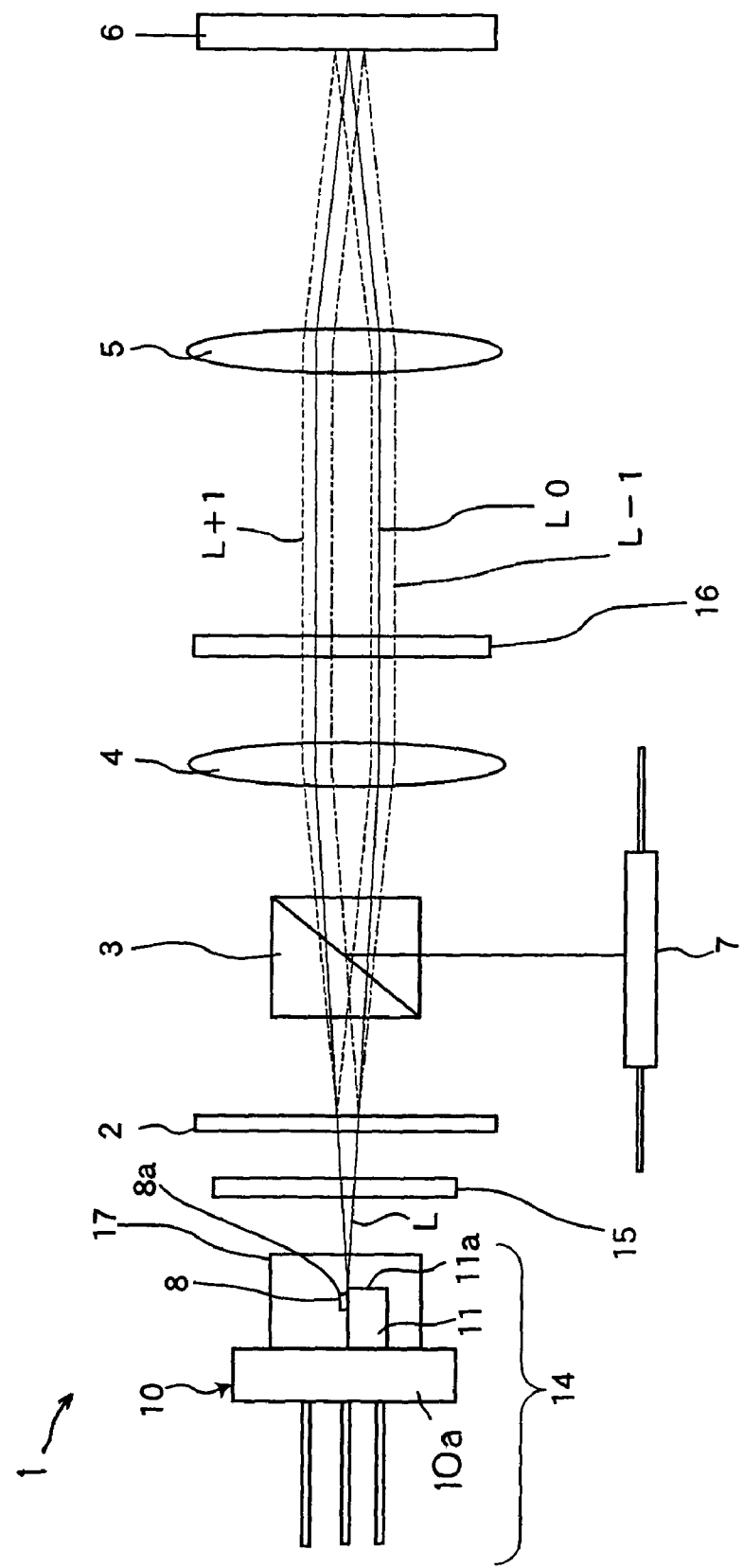
FIG. 1 is a view showing the construction of the optical system of an optical pickup device including a semiconductor laser device according to a first embodiment of this invention.

FIG. 1 shows a schematic construction of a optical pickup device according to a first embodiment of this invention. This optical pickup device includes a semiconductor laser device 1, a 3-beam generating diffraction grating 2, a beam splitter 3, a collimator lens 4, an object lens 5 and a photodetector 7.

The semiconductor laser device 1 is constructed of a main body 14 and a polarizing diffraction grating 15. The 3-beam generating diffraction grating 2 is arranged so that light emitted from the main body 14 of the semiconductor laser device 1 passes through the 3-beam generating diffraction grating 2. The collimator lens 4 changes the light which passes through this 3-beam generating diffraction grating 2 into parallel light. The object lens 5 concentrates the parallel light on the surface of an optical disk 6 as an object to be irradiated, that is, an optical recording medium. Between the 3-beam generating diffraction grating 2 and the collimator lens 4, the beam splitter 3 is arranged to reflect the reflected light from the optical disk 6. The photodetector 7 is so provided as to receive and detect the light reflected by the beam splitter 3. Between the collimator lens 4 and the object lens 5, a quarter-wavelength plate 16 is located.

The optical disk 6 generally represents the optical recording media on which reproduction or recording is carried out by using light, such as pit disks specially for reproduction, phase change disks and magneto-optical disks capable of recording, erase and reproduction, and write once type disks capable of recording and reproduction.

A more detailed explanation of the semiconductor laser device 1 is given blow. The polarizing diffraction grating 15 is arranged between the main body 14 of the semiconductor laser device 1 and the 3-beam generating diffraction grating 2. The main body 14 has a stem 10 that serves as a base and a semiconductor laser 8 that serves as a light source mounted on a header section 11 of part of the stem 10. The stem 10 is constructed of a disk-shaped base portion 10a and the header section 11 that protrudes from an approximate center portion of this base portion 10a. To the base portion 10a of the stem 10 is attached a cap 17 that covers the semiconductor laser 8 and the header section 11. This semiconductor laser 8 emits a laser beam L including P-polarized light and S-polarized light from a light-emitting end surface 8a, that is, a front end surface of the semiconductor laser 8.

When this laser beam L is incident on the polarizing diffraction grating 15, the polarizing diffraction grating 15 makes the entire P-polarized light of the laser beam L go straight to become zero-order light ray and makes the entire S-polarized light of the laser beam L diffract to become positive and negative first-order light rays. It is to be noted that a diffraction angle of the polarizing diffraction grating 15 differs from a diffraction angle of the 3-beam generating diffraction grating 2.

The quarter-wavelength plate 16 is arranged so that the P-polarized light gone straight by the polarizing diffraction grating 15 is incident on the quarter-wavelength plate 16. The quarter-wavelength plate 16 gives a phase difference of 90° to lights of the laser beam L whose polarization directions are perpendicular to each other. In other words, the quarter-wavelength plate 16 operates as a phase difference plate that changes the P-polarized light into circularly polarized light and changes the circularly polarized light into the S-polarized light.

The optical pickup device operates as follows when information recorded on the optical disk 6 is detected.

The laser beam L emitted from the semiconductor laser 8 is made incident on the polarizing diffraction grating 15 through the cap 17. The polarizing diffraction grating 15 makes the entire P-polarized light of the laser beam L go straight to become zero-order light ray and makes the entire S-polarized light of the laser beam L diffract to become positive and negative first-order light rays. As a result, only the P-polarized light of the laser beam L is made incident from the 3-beam generating diffraction grating 2 on the optical systems that includes the beam splitter 3, the collimator lens 4, the quarter-wavelength plate 16 and the object lens 5.

More specifically, the P-polarized light of the laser beam L is incident on the 3-beam generating diffraction grating 2 and is split into the main beam L0 and the two side beams L+1 and L−1 by this 3-beam generating diffraction grating 2. Next, the main beam L0 and the side beams L+1, L−1 pass through the beam splitter 3 and thereafter the collimator lens 4 to become parallel light and then are made incident on the quarter-wavelength plate 16. Each of the main beam L0 and the side beams L+1 and L−1 is changed into circularly polarized light by this quarter-wavelength plate 16, thereafter transmitted through the object lens 5, and applied in a focused spot to a surface of the optical disk 6.

Then, the above-stated three beams are reflected on the surface of the optical disk 6, transmitted again through the object lens 5 and made incident on the quarter-wavelength plate 16. The three beams are then transformed into S-polarized light by the quarter-wavelength plate 16. The beams are thereafter transmitted through the collimator lens 4, and reflected by the beam splitter 3 to be made incident on the photodetector 7. This photodetector 7 detects the S-polarized light to reproduce the information recorded on the optical disk 6. On the basis of this detected S-polarized light, tracking error information is also obtained.

Part of the S-polarized light incident on the beam splitter 3 is transmitted through the beam splitter 3. The above-stated part of the S-polarized light is further transmitted through the 3-beam generating diffraction grating 2 as zero-order light, and made incident on the polarizing diffraction grating 15. The polarizing diffraction grating 15 diffracts the S-polarized light to deviate from the direction toward the semiconductor laser 8.

That is to say, in the forward path of the light laser beam L emitted from the semiconductor laser 8 up to the optical disk 6, the P-polarized light of the light laser beam L is transmitted by the polarizing diffraction grating 15 and transformed into circularly polarized light by the quarter-wavelength plate 16. In the return path from the optical disk 6, the circularly polarized light is transformed into S-polarized light by the quarter-wavelength plate 16 and made incident on the polarizing diffraction grating 15. The polarizing diffraction grating 15 diffracts the S-polarized light, and thereby, the S-polarized light does not reach the semiconductor laser 8.

In this way, the return light constituted of this S-polarized light can be prevented from being incident on the light-emitting end surface 8*a* of the semiconductor laser 8. Therefore, the generation of the SCOOP phenomenon can be restrained without increasing the reflectance of the light-emitting end surface 8*a* of the semiconductor laser 8, and the output fluctuation of the laser beam L can be prevented. As a result, the differential efficiency of the laser beam L emitted from the laser chip 8 can be prevented from being reduced.

Even if the S-polarized light diffracted by the polarizing diffraction grating 15 is made incident on the end surface 11*a* of the header section 11, reflected on the end surface 11*a* and made incident again on the polarizing diffraction grating 15, then this S-polarized light is diffracted by the polarizing diffraction grating 15 to be deviated from the direction toward the optical disk 6.

Therefore, the return light constituted of this S-polarized light is prevented from returning to the optical system behind the polarizing diffraction grating 15 and prevented from interfering with the laser light in the forward path. This can eliminate the optical noises that the signal detection characteristic and/or the servo characteristic of the optical pickup device are significantly reduced due to the return light.

Moreover, this can be achieved without causing any reduction in mass productivity due to the machining process of the slant surface provided on the header section 11 of the stem 10 for the semiconductor laser 8 nor causing degradation in the light emission characteristic of the semiconductor laser 8 due to the reflector mounted on the header section 11 of the stem 10.

The return light is prevented from being incident on the photodetector 7 from the beam splitter 3 even if the return light constituted of the S-polarized light returned from the optical disk 6 is reflected on the end surface 11*a* of the header section 11, diffracted by the polarizing diffraction grating 15 and returned to the optical system behind the polarizing diffraction grating 15. This is because the diffraction angle of the polarizing diffraction grating 15 differs from the diffraction angle of the 3-beam generating diffraction grating 2. Therefore, even in this case, adverse influence can be prevented from exerting on the detection of the information recorded on the optical disk 6, and the degradation in the signal detection characteristic and the servo characteristic can reliably be prevented.

In the aforementioned embodiment, the cap 17 made of glass is separated from the polarizing diffraction grating 15. However, a glass cap integrated with the polarizing diffraction grating 15 may be employed instead of the cap 17. Thereby, the number of parts can be reduced.

Figure 2:
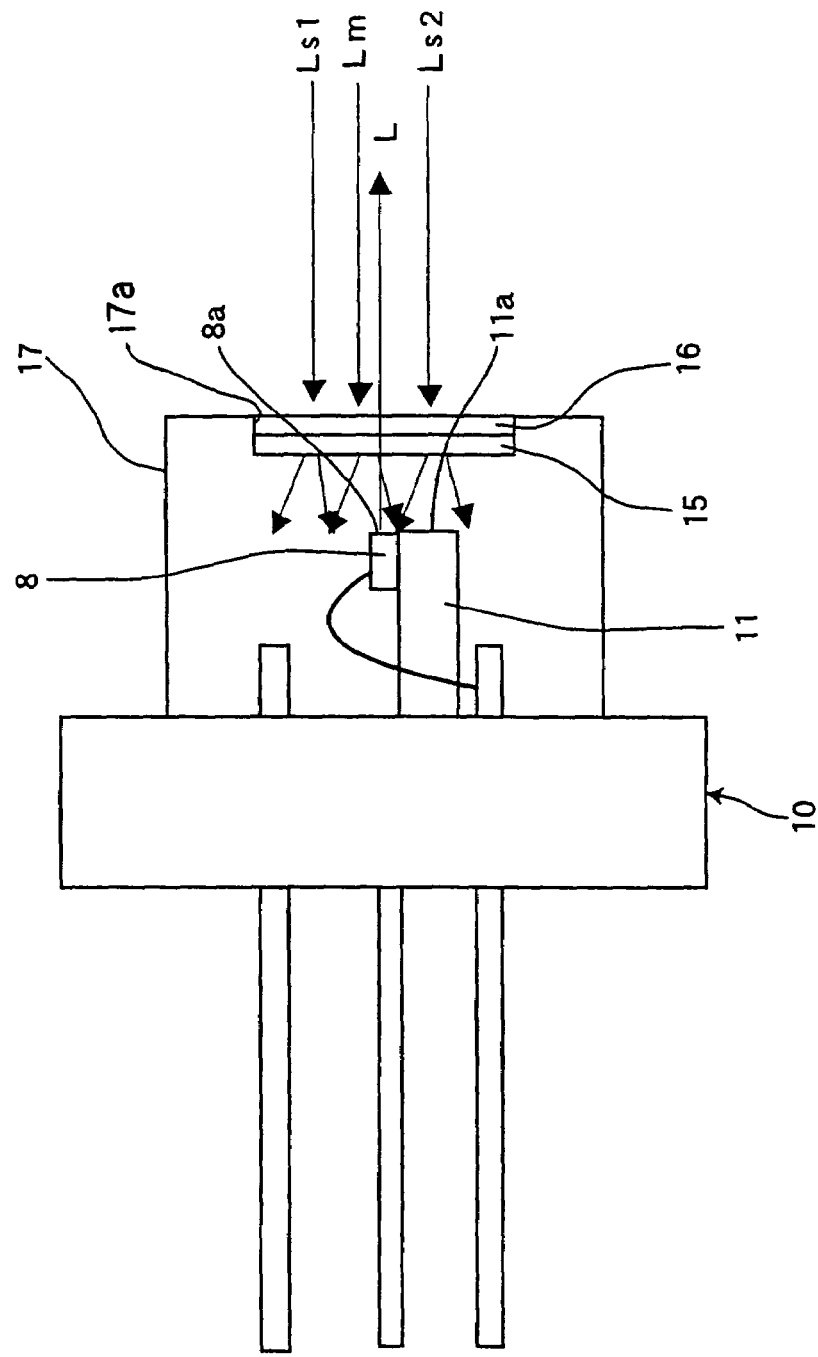
FIG. 2 is a view showing a modified example of the semiconductor laser device of the first embodiment.

Alternatively, as shown in FIG. 2, the polarizing diffraction grating 15 and the quarter-wavelength plate 16 may be integrated with the glass cap 17 by superposing the quarter-wavelength plate 16 on the front surface of the polarizing diffraction grating 15 attached to a window 17*a* of the glass cap 17. In this case, the number of parts is further reduced. In FIG. 2, Lm represents the reflected light corresponding to the main beam L0, and Ls1 and Ls2 represent the reflected light rays corresponding to the side beams L+1 and L−1.

Moreover, the quarter-wavelength plate 16 is a transparent film generally made of a resin material of polycarbonate, polyvinyl alcohol or the like.

The embodiment shown in FIG. 2 also avoids the problematic phenomena of the SCOOP, the degradation in the signal detection characteristic and the deterioration in the servo characteristic due to the interference of the return light.

In the embodiment shown in FIG. 1 or 2, the header section 11 and the stem 10 are integrated with each other. However, the header section 11 may be separated from the stem 10.

In the aforementioned embodiment, the polarizing diffraction grating 15 is employed which makes the P-polarized light of the laser beam L go straight and diffracts the S-polarized light of the laser beam L. However, in place of this polarizing diffraction grating 15, it is acceptable to employ a polarizing diffraction grating that reversely operates. That is, the polarizing diffraction grating may be used which makes the S-polarized light of the laser beam L go straight and diffracts the P-polarized light of the laser beam L.

Moreover, a diffraction grating constructed of a curved grating may be employed instead of the polarizing diffraction grating 15 constructed of a linear grating.

In the first embodiment shown in FIG. 1, the quarter-wavelength plate 16, the 3-beam generating diffraction grating 2 and the polarizing diffraction grating 15 are arranged in this order toward the semiconductor laser 8. However, the polarizing diffraction grating 15 may be mounted on a surface of the window glass provided at the laser light emitting portion of the cap 17 of the semiconductor laser 14. In the above case, the quarter-wavelength plate 16 may be provided between the 3-beam generating diffraction grating 2 and the window glass. In this case, the 3-beam generating diffraction grating 2, the quarter-wavelength plate 16 and the polarizing diffraction gratings 15 are to be arranged in this order toward the semiconductor laser 8.

Second Embodiment

Figure 3:
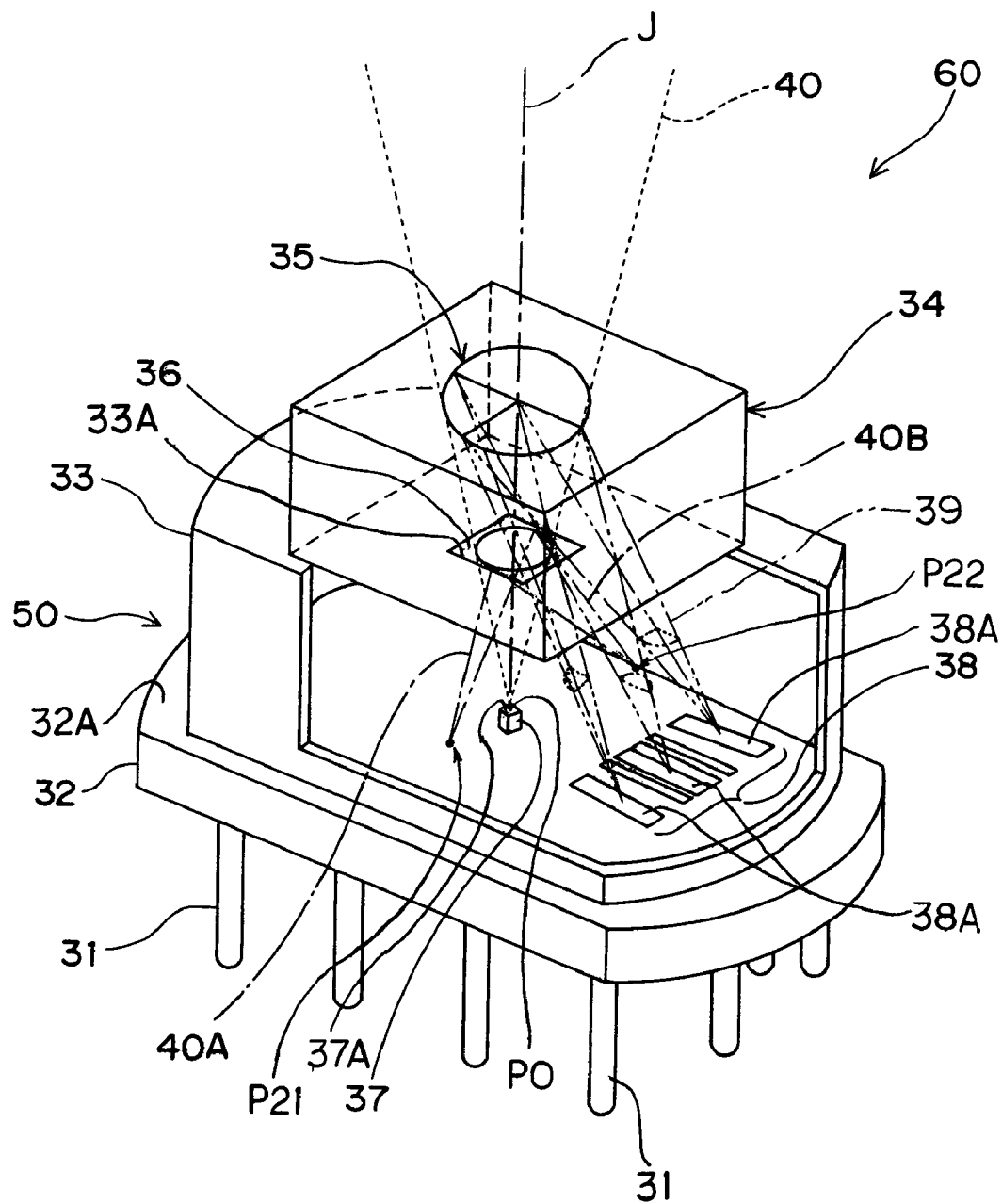
FIG. 3 is a view showing the structure of a semiconductor laser device according to a second embodiment of this invention.
Figure 4:
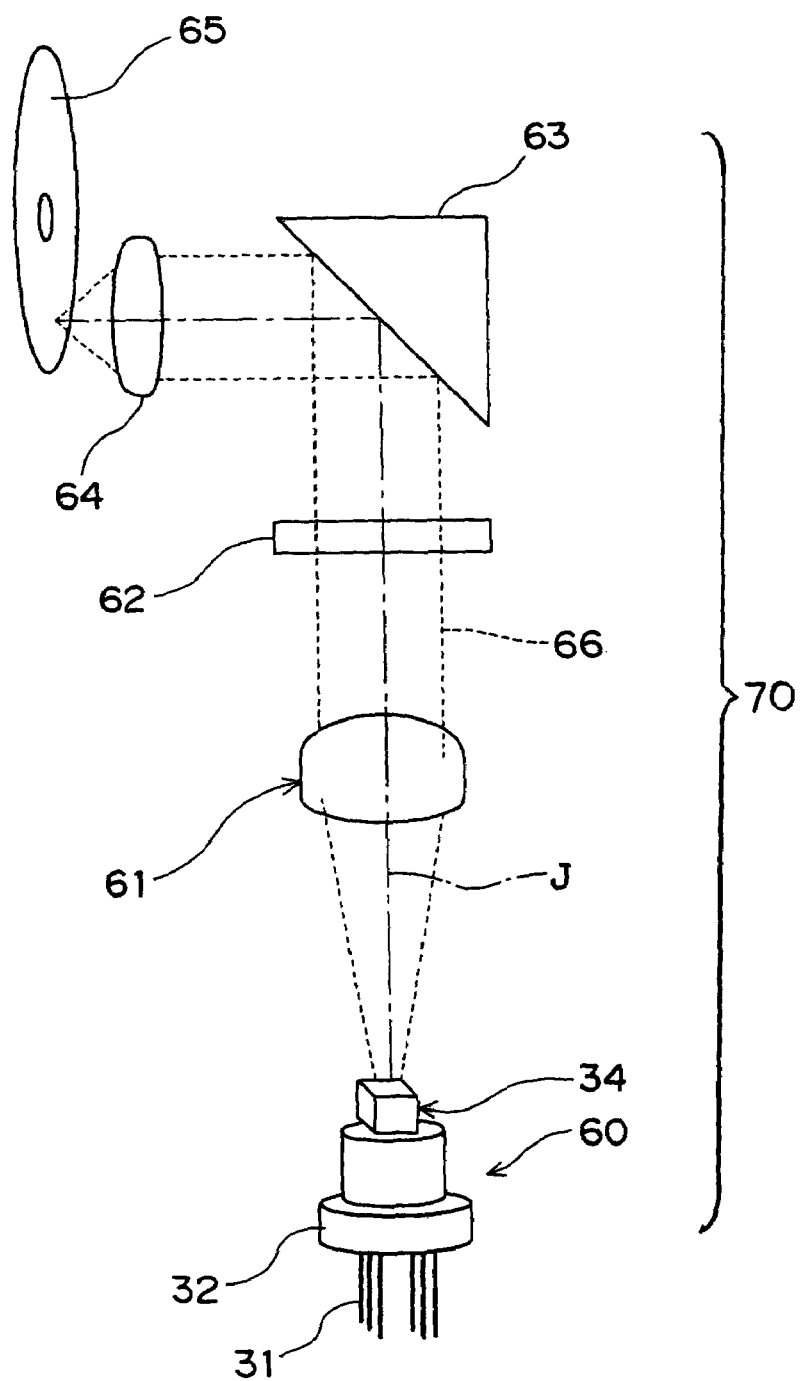
FIG. 4 is a view showing the structure of an optical pickup device provided with the second embodiment.
Figure 5:
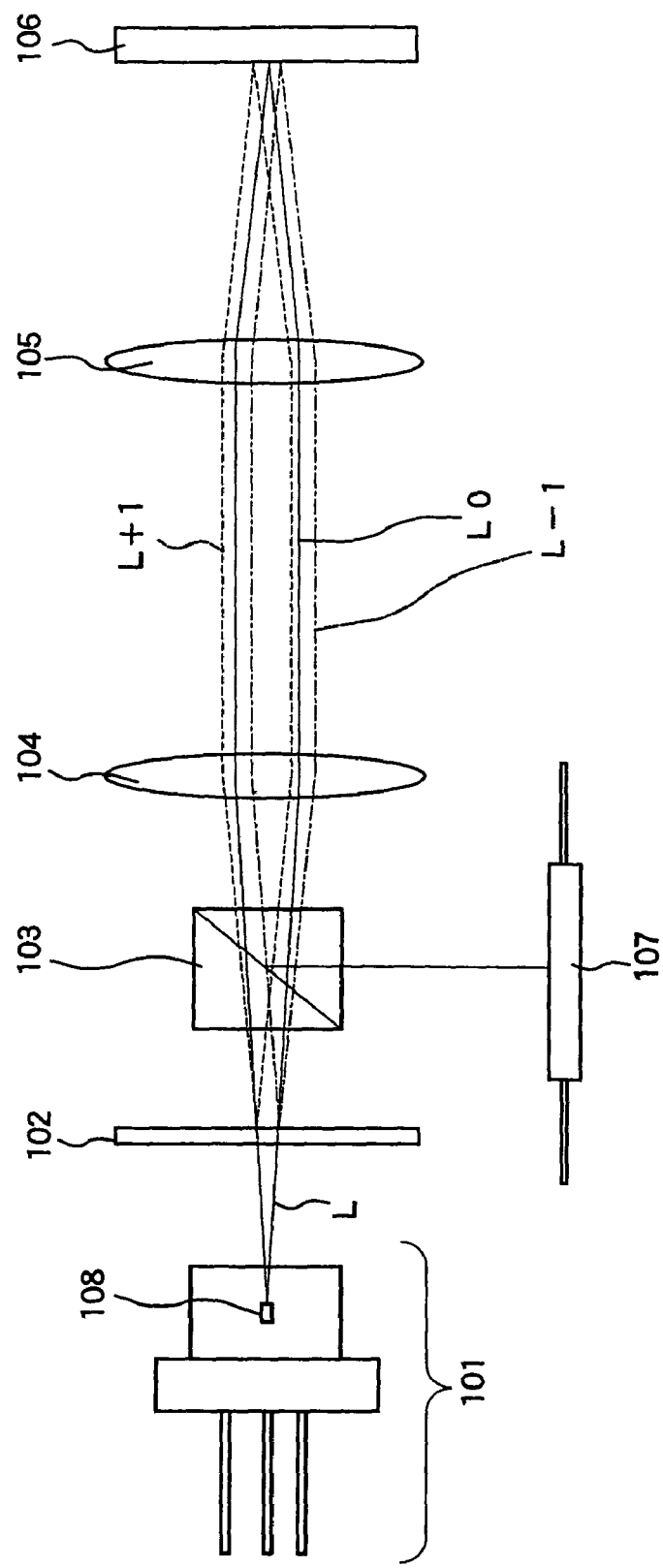
FIG. 5 is a view showing a conventional optical pickup device.
Figure 6:
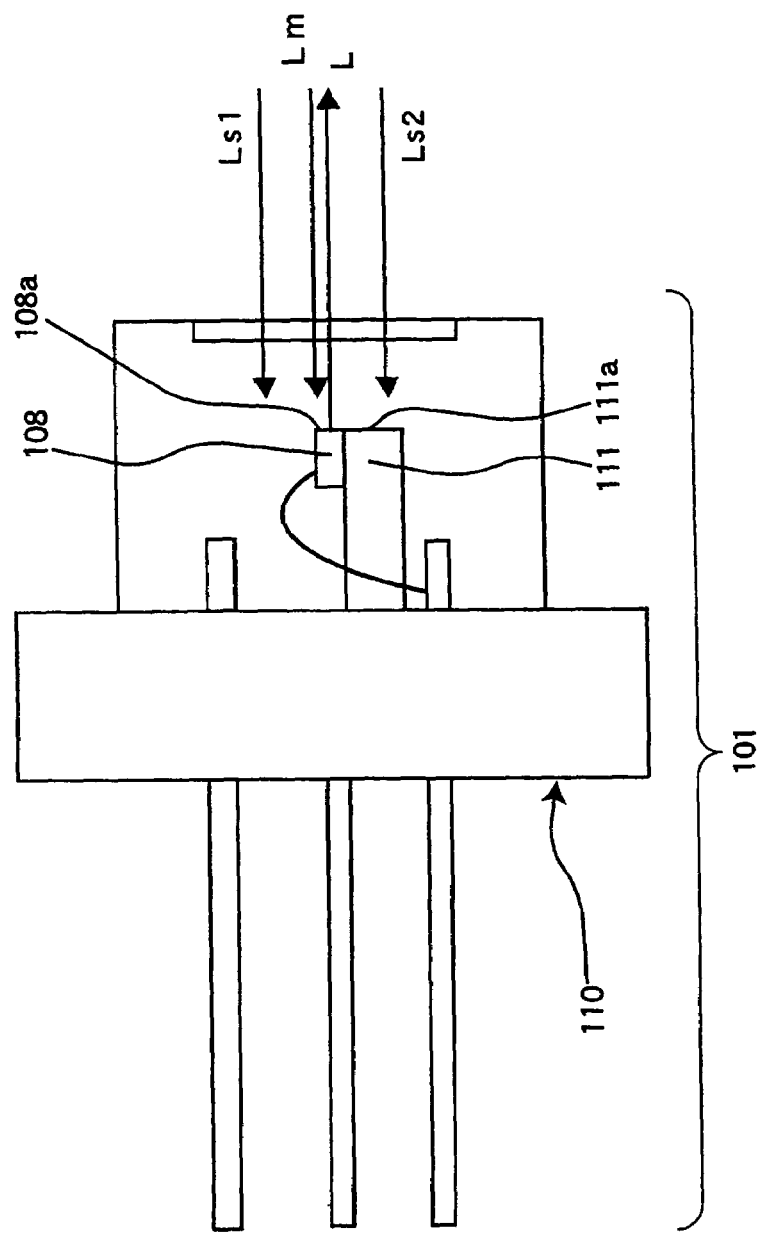
FIG. 6 is a view showing the semiconductor laser device owned by the above conventional optical pickup device.
Figure 7:
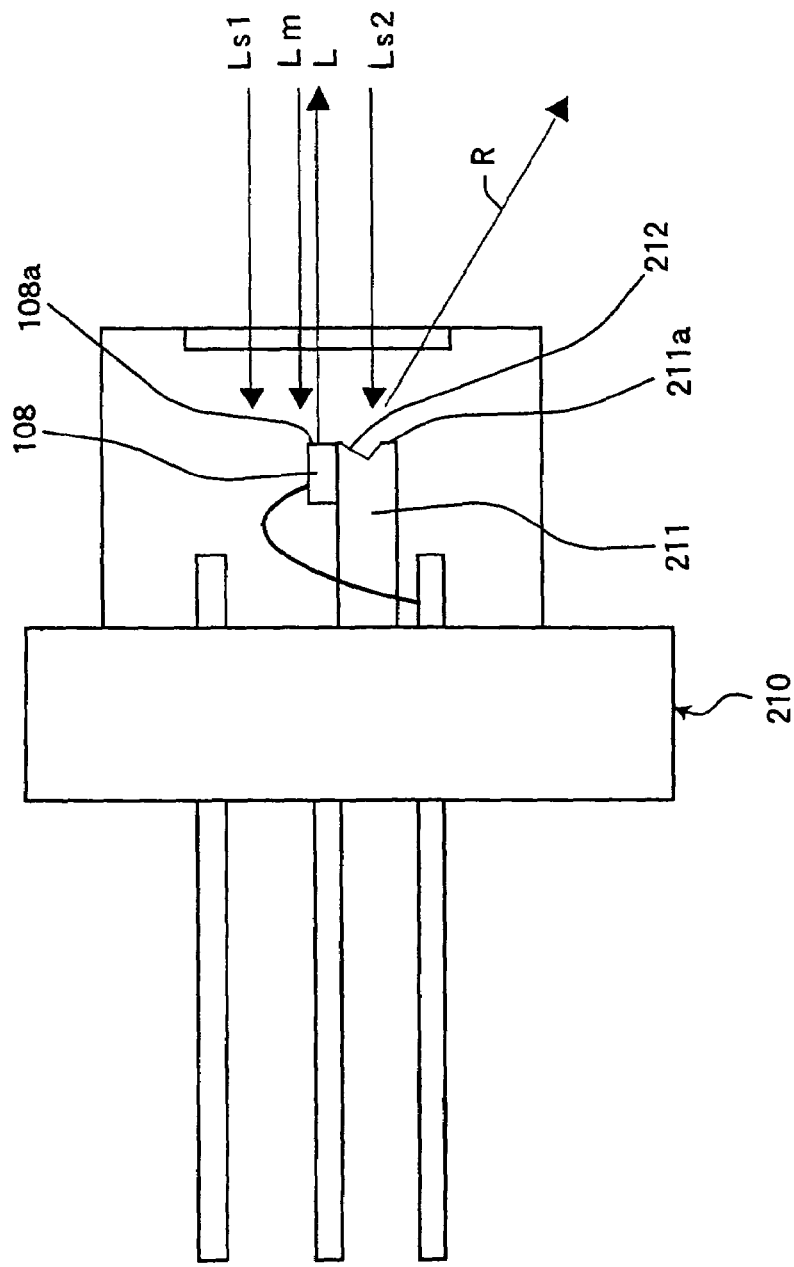
FIG. 7 is a view showing a modified example of the above conventional semiconductor laser device.
Figure 8:
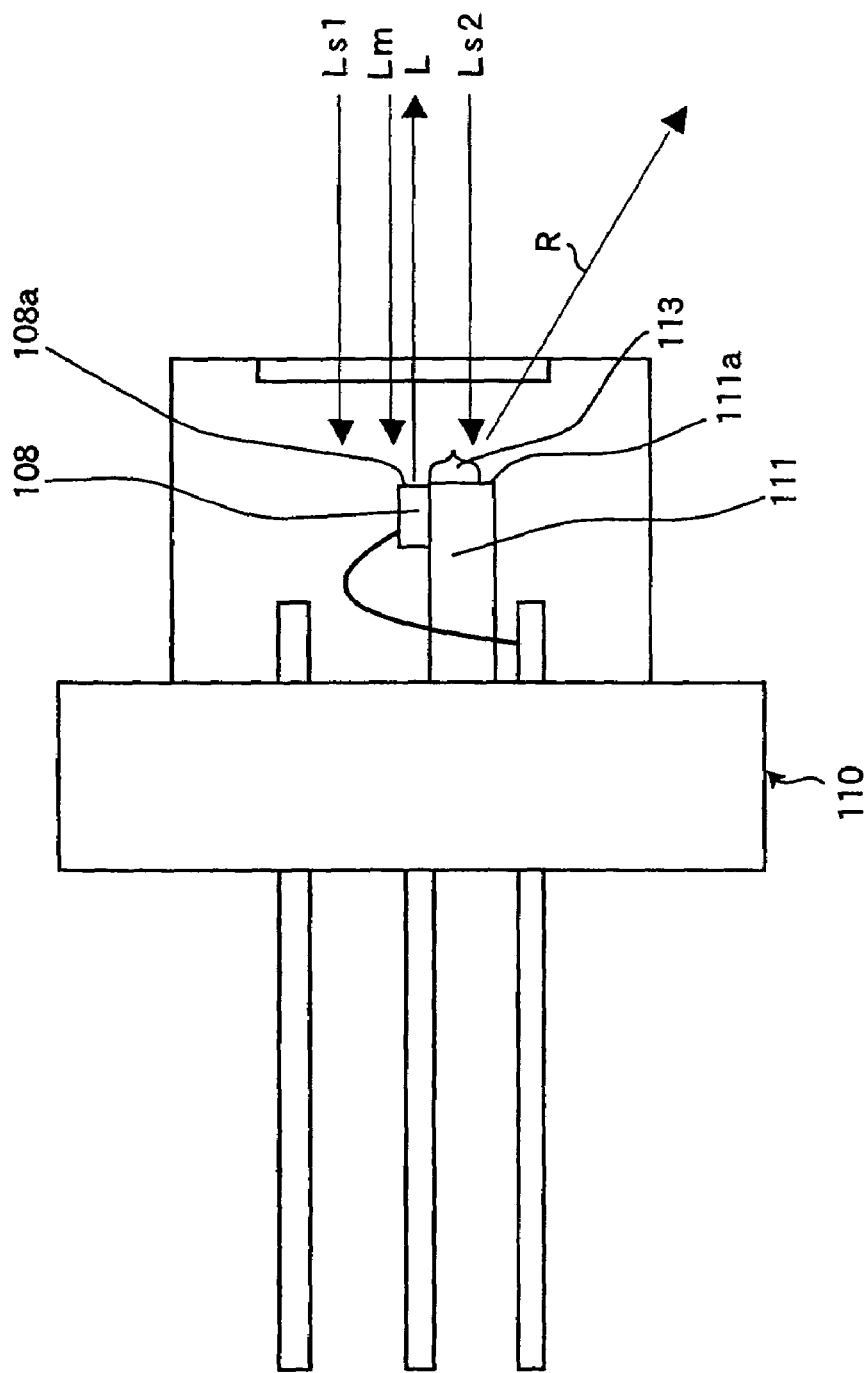
FIG. 8 is a view showing another modified example of the above conventional semiconductor laser device.
Figure 9:
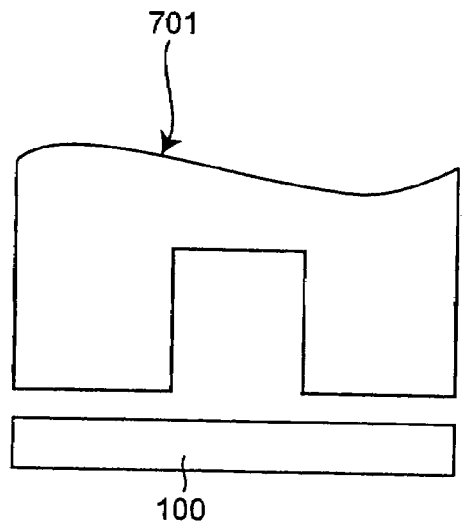
FIGS. 9A and 9B are views sequentially showing states in which the stem of the above conventional semiconductor laser device is formed.
Figure 9:
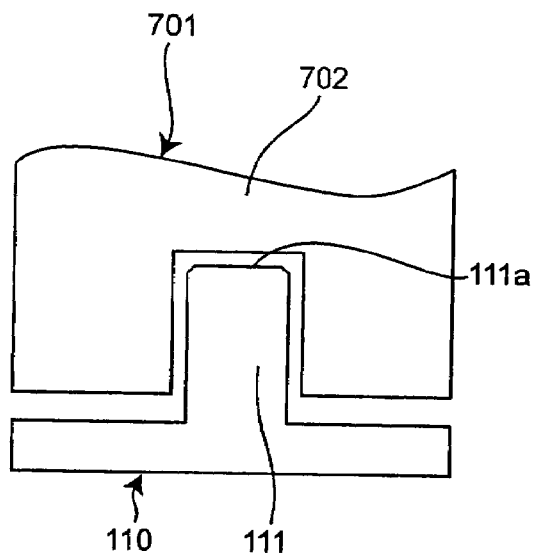
Figure 10:
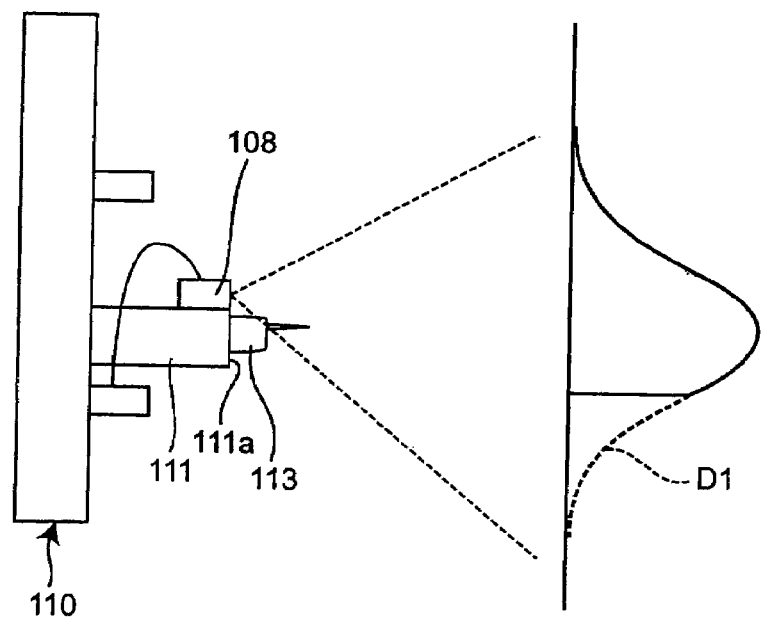
FIG. 10 is a schematic view showing the state of operation of the above conventional semiconductor laser device.
Figure 11:
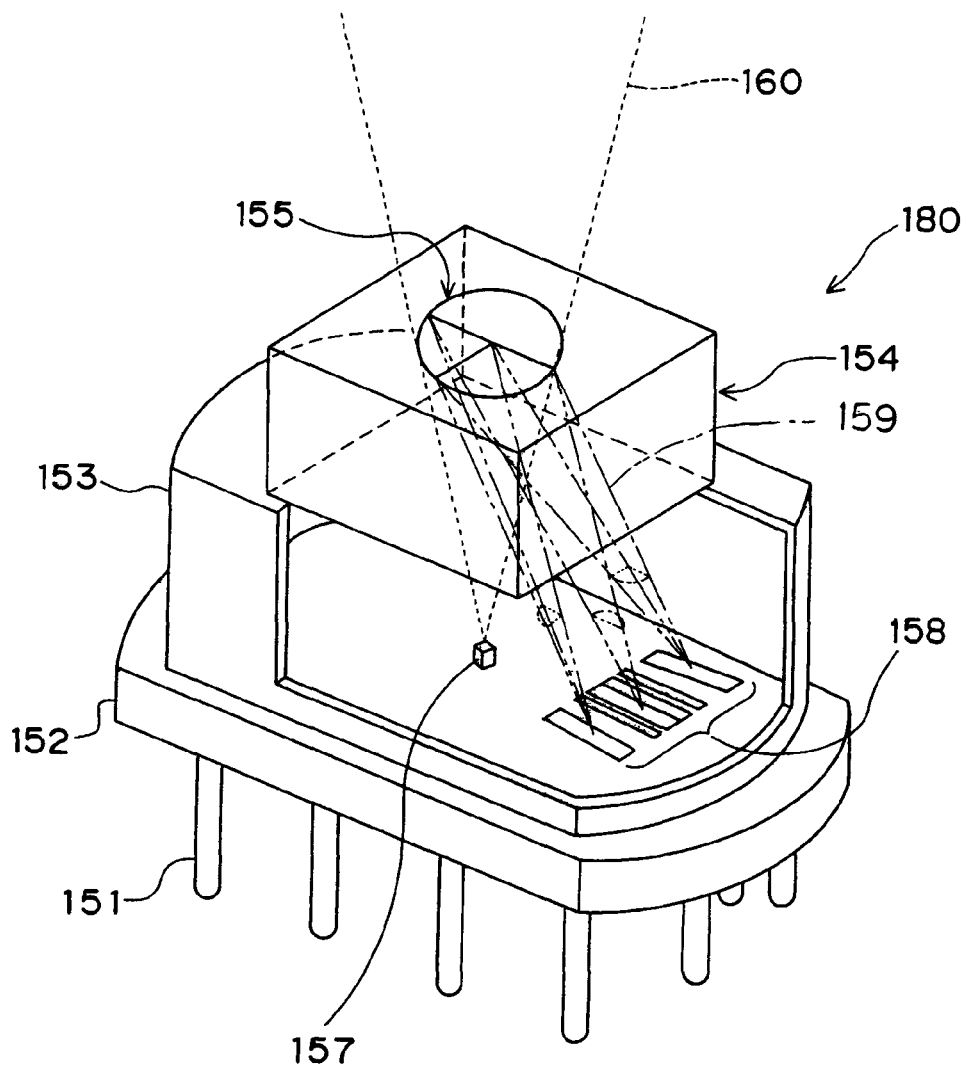
FIG. 11 is a view showing the structure of another conventional semiconductor laser device.
Figure 12:
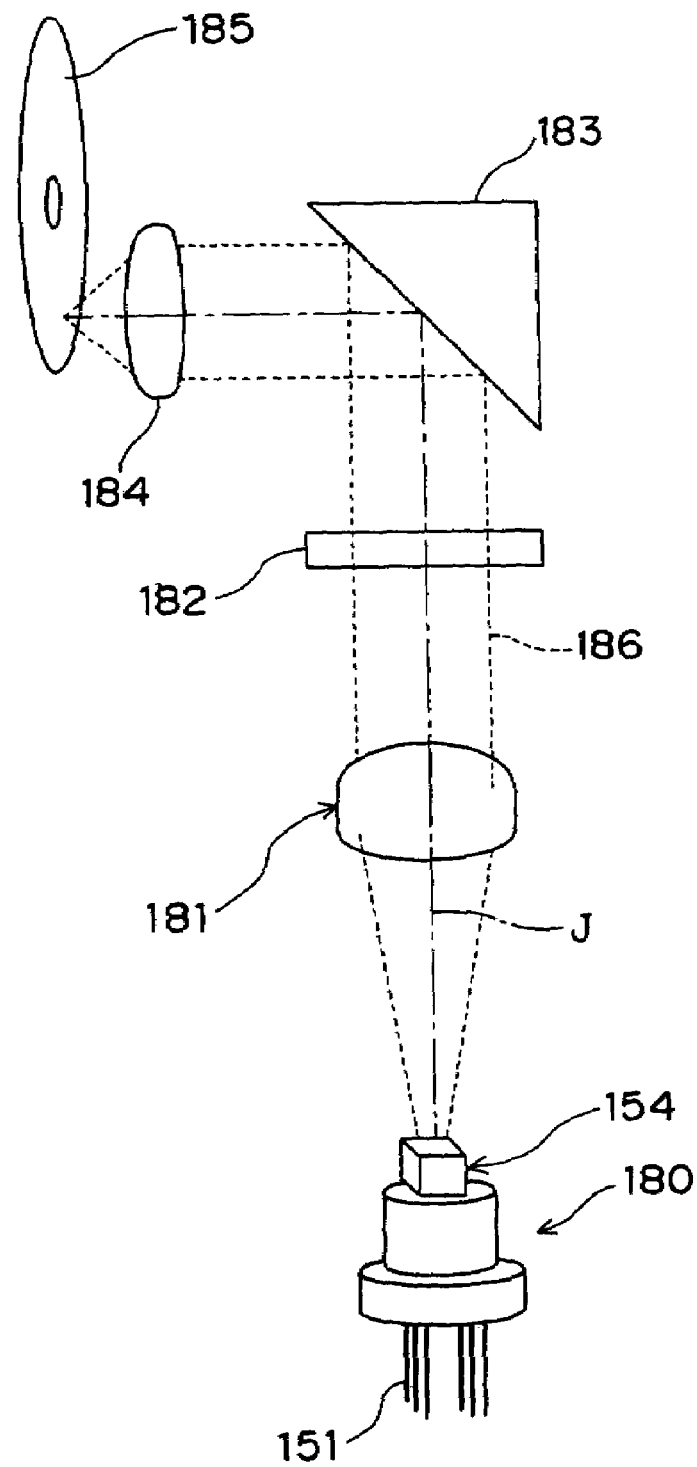
FIG. 12 is a view showing an optical pickup device provided with the semiconductor laser device of FIG. 11.

FIG. 3 shows a perspective view of a semiconductor laser device according to a second embodiment of the present invention. FIG. 4 shows a schematic sectional view of an optical pickup device provided with the semiconductor laser device shown in FIG. 3.

The semiconductor laser device 60 shown in FIG. 3 has a semiconductor laser 37, a hologram device 34 and a light-receiving device 38. The semiconductor laser 37 is a light source for emitting light toward an optical disk 65 as an optical recording medium shown in FIG. 4. The hologram device 34 has a signal hologram 35 and a polarizing diffraction grating 36.

The signal hologram 35 guides the light reflected on the optical disk 65 toward the light-receiving device 38 for signal detection. The light-receiving device 38 receives light 39 guided by the signal hologram 35. The polarizing diffraction grating 36 diffracts the zero-order diffracted light that is diffracted by the signal hologram 35.

The semiconductor laser 37 emits red light of a wavelength of about 650 nm for example which is used when a digital versatile disc (abbreviated to DVD) is employed as the optical disk 65.

The light-receiving device 38 is, for example, a photodiode. The light-receiving device 38 receives the light reflected from the optical disk 65, converts this reflected light into a current corresponding to the optical intensity of this reflected light and outputs a detection signal of the reflected light.

The semiconductor laser 37 and the light-receiving device 38 are arranged inside a package 50. The package 50 is constructed of a cap 33 and a base 32 whose upper surface 32A is roughly elliptic and perpendicular to the optical axis J of the semiconductor laser 37. The semiconductor laser 37 and the light-receiving device 38 are mounted on a heat radiator base (not shown). The heat radiator base is mounted on the base 32 made of metal such as steel. Moreover, the cap 33 made of metal such as steel is connected to the base 32 so as to cover the semiconductor laser 37 and the light-receiving device 38.

A connection surface (not shown) of the light-emitting end surface 37A of the semiconductor laser 37 is arranged parallel to the upper surface 32A. The semiconductor laser 37 and the light-receiving device 38 are electrically connected to lead pins 31 by gold wires (not shown). The lead pins 31 are extended to the outside of the package 50.

The hologram device 34 is made of a rectangular parallelepiped transparent material. The signal hologram 35 is formed on the top surface of the hologram device 34, while the polarizing diffraction grating 36 is formed on the bottom surface thereof.

The polarizing diffraction grating 36 is so arranged as to be parallel to a planar surface perpendicular to the optical axis J of the light emitted from the semiconductor laser 37, and to intersect the optical axis J. Also, the polarizing diffraction grating 36 is so arranged as to face a window 33A formed in the top plate of the cap 33.

The signal hologram 35 is arranged on the optical axis J of optical paths 40 and 66. The optical paths 40 and 66 are paths along which light travels while light emitted from the semiconductor laser 37 is reflected on the optical disk 65, and the reflected light is transmitted through the polarizing diffraction grating 36.

The signal hologram 35 of this second embodiment diffracts a returned light from the optical disk 65 into negative first-order diffracted light (not shown), zero-order diffracted light (not shown) and positive first-order diffracted light 39. The signal hologram 35 concentrates only the positive first-order diffracted light 39 on the light-receiving surface 38A of the light-receiving device 38 for signal processing. The zero-order diffracted light and the negative first-order diffracted light are not used for signal processing. It should be noted that the zero-order diffracted light is a passing-through light without being diffracted.

The polarizing diffraction grating 36 has approximately zero percent of the diffraction efficiency of the diffracted light rays other than the zero-order diffracted light with respect to the light (e.g., P-polarized light) that has a first polarization direction. Also, the polarizing diffraction grating 36 has approximately zero percent of the diffraction efficiency of the zero-order diffracted light with respect to the light (S-polarized light) that has a second polarization direction which is perpendicular to the first polarization direction.

Therefore, the light (P-polarized light) having the first polarization direction is transmitted as it is without being diffracted by the polarizing diffraction grating 36 as a zero-order diffracted light. Therefore, the light (S-polarized light) having the second polarization direction is diffracted to generate no zero-order diffracted light by the polarizing diffraction grating 36.

In the case where the light that has the first polarization direction is the P-polarized light, then the light that has the second polarization direction is the S-polarized light. In the case where the light that has the first polarization direction is the S-polarized light, then the light that has the second polarization direction is the P-polarized light.

In the optical pickup device of this second embodiment, the hologram device 34 splits the light reflected and returned from the optical disk 65 in order to separate a recorded signal from a tracking information signal for accurately reading the recorded signal, so that these signals are guided to the light-receiving device 38 to obtain the respective output signals.

In the optical pickup device 70 provided with the semiconductor laser device 60, the light emitted from the semiconductor laser 37 is made incident on the polarizing diffraction grating 36. The light in the first polarization direction passes through the polarizing diffraction grating 36 as it is, and then made incident on the signal hologram 35.

On the other hand, the light in the second polarization direction is diffracted by the polarizing diffraction grating 36 and deviated from the direction toward the signal hologram 35. Therefore, the light, which is transmitted through the polarizing diffraction grating 36 and made incident on the signal hologram 35, is constituted principally of the light in the first polarization direction.

The signal hologram 35 diffracts light rays other than the zero-order diffracted light among light rays incident on the signal hologram 35. Thus, only the zero-order diffracted light is made incident on the collimator lens 61 and transformed into parallel light by the collimator lens 61. The parallel light is transmitted through a quarter-wavelength plate 62, which causes a phase difference of 45° between lights whose polarization directions are perpendicular to each other. Thereafter, the light is reflected on a raising mirror 63 and concentrated on the optical disk 65 by an object lens 64.

Next, the light is reflected on the optical disk 65, and the reflected light is transformed into parallel light by the object lens 64. Then, the parallel light is reflected by the raising mirror 63 and transmitted through the quarter-wavelength plate 62. The quarter-wavelength plate 62 causes a further phase difference of 45° in the lights whose polarization directions are perpendicular to each other. Specifically, the quarter-wavelength plate 62 gives a phase difference of 90° in total between the light on the forward path toward the optical disk 65 and the light on the return path from the optical disk 65, in the lights whose polarization directions are perpendicular to each other. Thereafter, the light is collected toward the direction of the hologram device 34 by the collimator lens 61.

The light provided with the phase difference of 90° is the S-polarized light as the light in the second polarization direction in the case where the light in the first polarization direction is for example the P-polarized light.

Then, the light transmitted through the signal hologram 35 via the collimator lens 61 is diffracted into negative first-order diffracted light, zero-order diffracted light and positive first-order diffracted light. Only the positive first-order diffracted light 39 from among these diffracted light rays is concentrated on the light-receiving device 38 for signal processing.

The zeroth-order diffracted light and the negative first-order diffracted light out of the light rays transmitted through the signal hologram 35 by way of the collimator lens 61 are not used for signal processing. Then, the negative first-order diffracted light from the signal hologram 35 is not made incident on the polarizing diffraction grating 36, while the zeroth-order diffracted light (i.e., light in the second polarization direction transmitted as it is without being diffracted) from the signal hologram 35 is made incident on the polarizing diffraction grating 36. This zeroth-order diffracted light as the light in the second polarization direction is diffracted into negative first-order diffracted light 40A and positive first-order diffracted light 40B by being transmitted through the polarizing diffraction grating 36 and deviated from the optical path to the semiconductor laser 37. Therefore, no return light to the semiconductor laser 37 is generated. Moreover, in the polarizing diffraction grating 36, the zeroth-order diffraction efficiency with respect to the light in the second polarization direction is approximately zero percent. Accordingly, there is substantially generated no return light that travels from the signal hologram 35 and passes through the polarizing diffraction grating 36 and is made incident on the semiconductor laser 37.

Therefore, according to the semiconductor laser device 60 of this second embodiment, the incident light (return light) on the light-emitting end surface 37A of the semiconductor laser 37 can be restrained by the provision of the polarizing diffraction grating 36, and it becomes possible to provide measures against the return light of the laser light.

Moreover, according to this second embodiment, by concentrating the light, which returns as unnecessary light in the laser light emitted from the semiconductor laser 37, on focal points P21 and P22 located in regions other than the light-emitting end surface 37A of the semiconductor laser 37 and the light-receiving surface 38A of the light-receiving device 38, the unnecessary light concentrated on the focal points P21 and P22 can be restrained from being reflected again and from becoming stray light, and a highly reliable semiconductor laser device 60 and an optical pickup device 70 can be provided.

Moreover, in this second embodiment, the signal hologram 35 and the polarizing diffraction grating 36 are arranged on the optical axis J of the optical path 40 through which the reflected light, emitted from the semiconductor laser 37 and reflected on the optical disk 65, returns to the point roughly coinciding with the light-emitting point P0 of the semiconductor laser 37. With this arrangement, in this second embodiment, the reflected light, which is emitted from the semiconductor laser 37 and reflected on the optical disk 65, is diffracted so as not to generate zero-order diffracted light by the polarizing diffraction grating 36 before the light returns to the point roughly coinciding with the light-emitting point P0 of the semiconductor laser 37. Therefore, in the polarizing diffraction grating 36, the zero-order diffracted light, which may be incident on the semiconductor laser 37, is not generated, and the noise attributed to the return light can be restrained.

Moreover, in this second embodiment, the grating pitch of the polarizing diffraction grating 36 is a roughly equal pitch. With this arrangement, the reflected light, which is emitted from the semiconductor laser 37 and reflected on the optical disk 65, can be diffracted by the polarizing diffraction grating 36, and the diffracted positive first-order diffracted light 40B and the negative first-order diffracted light 40A can be concentrated equidistantly and stably. Therefore, the stray light attributed to the return light can easily be canceled by providing a reflectionless coating on the light concentration positions P22 and P21 or positioning the light concentration positions P22 and P21 in places where stray light is not generated.

Moreover, in this second embodiment, the polarizing diffraction grating 36 is arranged in a place through which the positive first-order diffracted light 39 diffracted by the signal hologram 35 does not pass. With this arrangement, the phenomenon that the polarizing diffraction grating 36 diffracts the positive first-order diffracted light 39 directed from the signal hologram 35 toward the light-receiving device 38 can be avoided. Therefore, the positive first-order diffracted light 39, which becomes the signal light, can be prevented from suffering an adverse influence such that the path thereof is changed by the polarizing diffraction grating 36. Moreover, the positive first-order diffracted light and the negative first-order diffracted light obtained by diffracting the reflected light from the optical disk 65 by the polarizing diffraction grating 36 can be stably concentrated on the desired places.

Moreover, this second embodiment is provided with the quarter-wavelength plate 62 separately from the hologram device 34, whereas the quarter-wavelength plate may be arranged inside the hologram device 34 (e.g., between the signal hologram 35 and the polarizing diffraction grating 36). In this case, by virtue of the provision of the quarter-wavelength plate that has the function to change the polarization direction inside the hologram device 34, the effect that the diffraction efficiency differs according to the polarization direction of the incident light, produced by the polarizing diffraction grating 36, can be obtained with a compact construction, and the optical pickup device 70 can be reduced in size.

Moreover, in the semiconductor laser device 60 of this second embodiment, the signal hologram 35 and the polarizing diffraction grating 36 are provided for the hologram device 34 of an identical optical member, and this therefore enables the achievement of a reduction in parts count, a reduction in size, a reduction in thickness and a reduction in manufacturing cost. Moreover, the optical pickup device 70, which is constructed of the semiconductor laser device 60, the collimator lens 61, the quarter-wavelength plate 62, the raising mirror 63 and the object lens 64, shown in FIG. 4, can be reduced in size.

Moreover, in the semiconductor laser device 60 of this second embodiment, the semiconductor laser 37, the signal hologram 35, the polarizing diffraction grating 36 and the light-receiving device 38 are integrated in one package 50. With this arrangement, a reduction in parts count and a reduction in size of the semiconductor laser device 60 can be achieved. The package 50 has an elliptic cross-sectional shape in the planar surface perpendicular to the optical axis J of the semiconductor laser 60. This therefore allows the achievement of thickness reduction in the direction perpendicular to the optical axis direction and further allows the achievement of thickness reduction of the optical pickup device in comparison with the case where a package whose cross-sectional shape is circular is adopted.

If the signal hologram 35 and the polarizing diffraction grating 36 are constructed of separate optical members in this second embodiment, it is possible to attach, for example, the signal hologram 35 to the hologram device 34 and provide the polarizing diffraction grating 36 at the window 33A or the like formed in the cap 33 located on the package 50 side where the semiconductor laser 37 is housed. In this case, it becomes easy to adjust the positions of the signal hologram 35 and the polarizing diffraction grating 36 relatively to each other.

Third Embodiment

Figure 13:
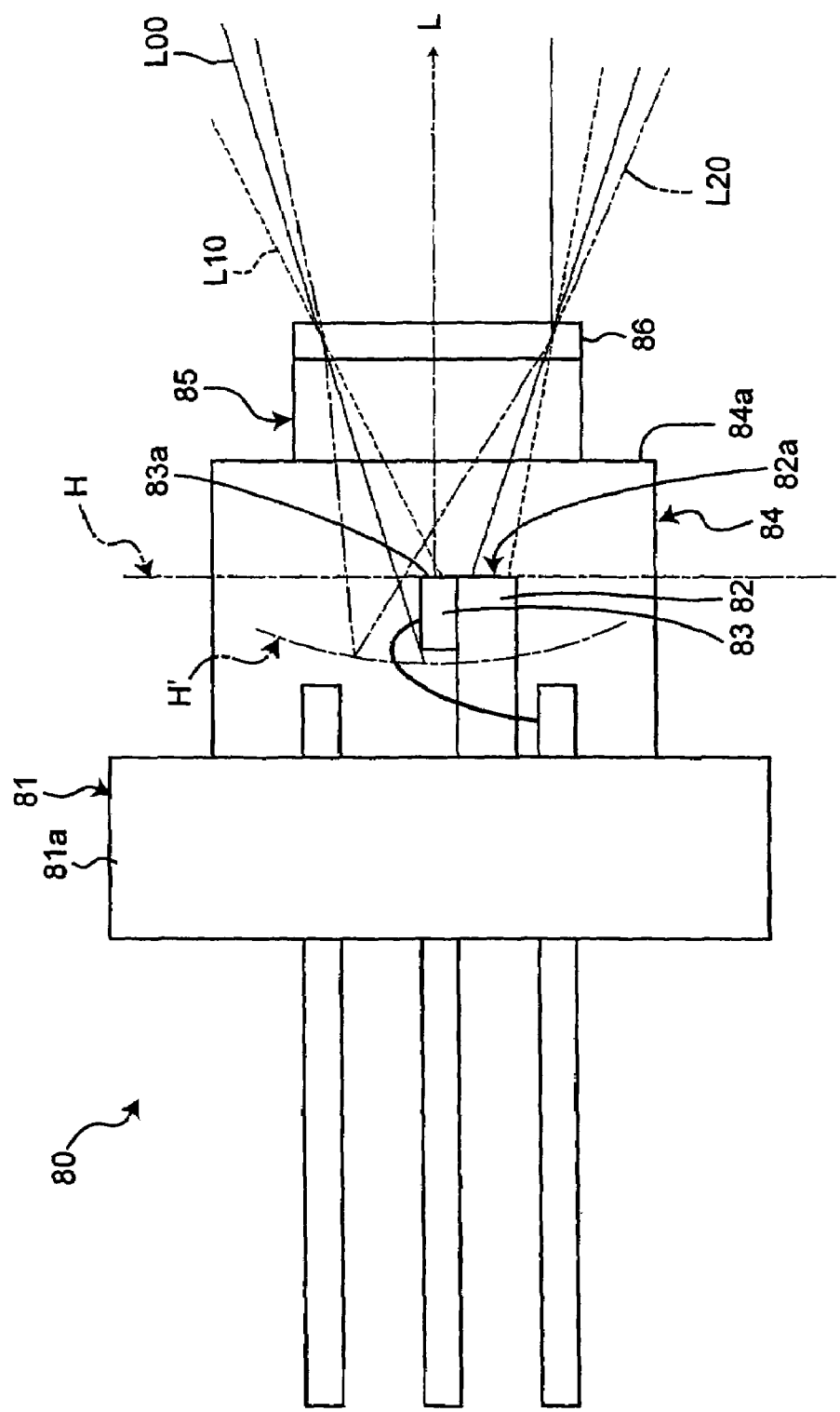
FIG. 13 is a view showing the structure of a semiconductor laser device according to a third embodiment of this invention.

A semiconductor laser device according to a third embodiment of this invention is shown in FIG. 13.

The semiconductor laser device 80 of the third embodiment has a stem 81 as a base and a semiconductor laser 83 as a light source. The semiconductor laser 83 is mounted on a header section 82 that is a part of the stem 81. The stem 81 is constructed of a base portion 81a and the header section 82 that protrudes from this base portion 81a. A cap 84 which covers the semiconductor laser 83 and the header section 82 is attached to the base portion 81a of the stem 81. The semiconductor laser 83 emits a laser beam L from a light-emitting end surface 83a that is a front end surface of the semiconductor laser 83. The laser beam L is constituted of laser light that includes P-polarized light and S-polarized light.

A hologram device 85 is attached to a top plate 84a of the cap 84 so as to cover a window (not shown) formed in the top plate 84a. The hologram device 85 includes a polarizing diffraction grating 86 in an upper surface portion thereof.

The polarizing diffraction grating 86 is a polarizing diffraction grating that has no diffraction effect on a prescribed polarization direction light included in the emission light emitted from the semiconductor laser 83. Therefore, the polarizing diffraction grating 86 has no lens action on the light in the prescribed polarization direction that the emitted light (laser beam L) includes. Therefore, the polarizing diffraction grating 86 exerts no influence on the optical action of the light in the prescribed polarization direction with respect to the optical system arranged closer to the laser beam L than this polarizing diffraction grating 86.

The optical system is constructed of, for example, a 3-beam generating diffraction grating 2, a beam splitter 3, a photodetector 7, a collimator lens 4, a quarter-wavelength plate 16, an object lens 5 and an optical disk 6 as shown in FIG. 1. Moreover, the optical system is assumed to have the quarter-wavelength plate 16 between the polarizing diffraction grating 86 and the optical disk 6.

Therefore, a phase difference of 90° generates between the light rays of the laser light perpendicular to each other by passing the laser light through the quarter-wavelength plate 16 two times, while the laser light emitted from the semiconductor laser 83 is returned to the polarizing diffraction grating 86 after reflected on the optical disk 6. As a result, for example, if the emitted laser light is linearly polarized light, then the reflected light returned to the polarizing diffraction grating 86 becomes circularly polarized light.

Moreover, the polarizing diffraction grating 86 has a concave lens action on the light returned from the optical disk 6. For this reason, its composite focus position is located in the curved surface H' as shown in FIG. 13, the composite focus position being formed by the polarizing diffraction grating 86 and the optical system on the optical disk side.

Consequently, as shown in FIG. 13, the polarizing diffraction grating 86 diffracts a reflected light L10 to guide it to the end surface 82a of the header 82. The reflected light L10 derives from the positive first-order diffracted light which is generated by the 3-beam generating diffraction grating 2 in the forward path of the laser beam L from the semiconductor laser 83 to the optical disk 6, reflected on the optical disk 6 and returned to the polarizing diffraction grating 86.

Also, as shown in FIG. 13, the polarizing diffraction grating 86 diffracts a reflected light L20 and makes it incident on a curved surface H' different from the light-emitting end surface 83a without making the reflected light incident on the light-emitting end surface 83a. The reflected light L20 derives from the negative first-order diffracted light which is generated by the 3-beam generating diffraction grating 2 in the forward path, reflected on the optical disk 6 and returned to the polarizing diffraction grating 86.

Thus, the polarizing diffraction grating 86 prevents the reflected light rays L10 and L20 from returning to the light-emitting end surface 83a of the semiconductor laser 83, so that the occurrence of the SCOOP noise is avoided.

An image of the reflected light L10 is formed on the curved surface H' different from a planar surface H including the light-emitting end surface 83a. Therefore, even if the reflected light L10 is made incident and reflected on the end surface 82a of the header 82, this reflected light does not form an image in, for example, the external photodetector 7 shown in FIG. 1, which eliminates occurrence of reduced detection intensity.

The reflected light L20 does not exert influence on only a specified light-receiving unit (not shown) located on a base portion 81a in the cap 84 as one example, and therefore exerts almost no harmful influence on the detection signal.

As shown in FIG. 13, the polarizing diffraction grating 86 doe not make a reflected light L00 form an image on the light-emitting end surface 83a, but form the image on the curved surface H' behind the semiconductor laser 83. The reflected light L00 derives from the zero-order diffracted light which is generated by the 3-beam generating diffraction grating 2 in the forward path of the laser beam L from the semiconductor laser 83 to the optical disk 6, reflected on the optical disk 6 and returned to the polarizing diffraction grating 86.

The reflected light L00 spreads without focusing on the planar surface H including the light-emitting end surface 83a by the polarizing diffraction grating 86. This restrains occurrence of the SCOOP noise in the semiconductor laser 83.

The polarizing diffraction grating 86 is not constituted of straight lines but of curves in order to make the polarizing diffraction grating 86 have a concave lens action as described above. The grating curve of the polarizing diffraction grating 86 has a large radius of curvature close to a straight line. This is because it is merely required to displace the focus positions of the reflected light rays L00, L10 and L20 by a small distance from the planar surface H to the curved surface H'.

If the polarizing diffraction grating 86 does not generate zero-order diffracted light, there is no light that returns to the end surface 83a of the semiconductor laser element 83, and therefore the SCOOP noise can be completely avoided. However, to eliminate the generation of zero-order diffracted light, it is required to exalt the polarization selectivity of the polarizing diffraction grating 86. That is, it is required to deepen the groove depth of the grating, which makes manufacturing of the polarizing diffraction grating 86 becomes difficult a little.

The polarizing diffraction grating 86 may have a lens characteristic such that the reflected light rays L00, L10 and L20 are transformed into parallel light rays. In this case, the reflected light rays L00, L10 and L20 scarcely enter into the semiconductor laser 83 since the reflected light rays L00, L10 and L20 are parallel and do not form any image on the light-emitting end surface 83a. Therefore, the SCOOP noise can be avoided.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. A semiconductor laser device comprising:
a semiconductor laser for emitting laser light toward an object to be irradiated;
a diffracting section for diffracting laser light reflected by the object according to a polarization direction of the reflected laser light to deviate the reflected laser light from a direction toward the semiconductor laser; and
a 3-beam generating diffraction grating to diffract the laser light, which is emitted from the semiconductor laser and diffracted by the diffracting section, into zero-order light, positive first-order light and negative first-order light and having no polarization property, wherein
a diffraction angle of the diffracting section differs from a diffraction angle of the 3-beam generating diffraction grating.

2. The semiconductor laser device as set forth in claim 1, further comprising:
a hologram device having a signal hologram; and
a light-receiving device, wherein
the laser light emitted from the semiconductor laser is applied to the object to be irradiated by way of the signal hologram,
the laser light reflected on the object is diffracted by the hologram device, and
the diffracted laser light is received by the light-receiving device.

3. The semiconductor laser device as set forth in claim 1, wherein
the diffracting section is comprised of a polarizing diffraction grating,
the polarizing diffraction grating is constructed so that a diffraction efficiency of the diffracted light rays other than zero-order diffracted light is approximately zero percent with respect to light that has a first polarization direction, and that a diffraction efficiency of the diffracted light of the zero-order diffracted light is approximately zero percent with respect to light that has a second polarization direction perpendicular to the first polarization direction.

4. The semiconductor laser device as set forth in claim 1, further comprising:
a quarter-wavelength plate, wherein the diffracting section and the quarter-wavelength plate are arranged in order toward the semiconductor laser.

5. The semiconductor laser device as set forth in claim 1, further comprising:
a base on which the semiconductor laser is mounted; and
a cap having a window through which the laser beam passes and attached to the base, wherein the diffracting section is comprised of a polarizing diffraction grating and the polarizing diffraction grating is attached to the window.

6. The semiconductor laser device as set forth in claim 5, further comprising:
a quarter-wavelength plate attached to the window so as to be superposed on the polarizing diffraction grating.

7. The semiconductor laser device as set forth in claim 2, wherein
the diffracting section is comprised of a polarizing diffraction grating, and
the signal hologram and the polarizing diffraction grating are arranged on an optical axis of an optical path of the reflected laser light toward a light-emitting point of the semiconductor laser.

8. The semiconductor laser device as set forth in claim 1, wherein the diffracting section is comprised of a polarizing diffraction grating formed by a linear grating with a roughly equal pitch.

9. The semiconductor laser device as set forth in claim 2, wherein
the diffracting section is comprised of a polarizing diffraction grating, and
the diffracted light diffracted by the signal hologram does not pass through the polarizing diffraction grating.

10. The semiconductor laser device as set forth in claim 2, wherein
the diffracting section is comprised of a polarizing diffraction grating, and
a quarter-wavelength plate is provided in the hologram device.

11. The semiconductor laser device as set forth in claim 2, wherein
the diffracting section is comprised of a polarizing diffraction grating, and
the hologram device is an optical member that integrally has the signal hologram and the polarizing diffraction grating.

12. The semiconductor laser device as set forth in claim 2, wherein
the diffracting section is comprised of a polarizing diffraction grating, and
the signal hologram and the polarizing diffraction grating are provided as separate optical members.

13. The semiconductor laser device as set forth in claim 2, wherein
the diffracting section is comprised of a polarizing diffraction grating, and
the semiconductor laser, the signal hologram, the polarizing diffraction grating and the light-receiving device are integrated in one package.

14. The semiconductor laser device as set forth in claim 1, wherein
the diffracting section is comprised of a polarizing diffraction grating, and
the polarizing diffraction grating has a lens characteristic such that the reflected laser light forms an image on a surface different from a light-emitting end surface of the semiconductor laser and a extended surface of the light-emitting end surface in a direction along which the reflected light travels or a lens characteristic such that the reflected laser light is formed into parallel light.

15. An optical pickup device comprising:
the semiconductor laser device set forth in claim 1 wherein the diffracting section is comprised of a polarizing diffraction grating,
an optical system guiding the laser light emitted from the semiconductor laser to an optical recording medium that serves as the object to be irradiated and guiding the light reflected from the optical recording medium to the polarizing diffraction grating, wherein
the optical system has a phase difference plate for changing a state of polarization of the light emitted from the semiconductor laser from linearly polarized light into circularly polarized light or from circularly polarized light into linearly polarized light.

16. An optical pickup device comprising:
the semiconductor laser device set forth in claim 2, and
a photodetector for detecting the laser light reflected from the object to be irradiated.

* * * * *